US010252701B2

United States Patent
Chuang et al.

(10) Patent No.: US 10,252,701 B2
(45) Date of Patent: Apr. 9, 2019

(54) OBJECT TRACKING SYSTEM AND METHOD THEREWITH

(71) Applicant: Industrial Technology Research Institute, Hsinchu (TW)

(72) Inventors: Chun-Fu Chuang, Kaohsiung (TW); Wei-Po Nien, Taichung (TW); Chung-Hsien Yang, Taipei (TW); Chun-Che Chang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/431,777

(22) Filed: Feb. 14, 2017

(65) Prior Publication Data

US 2018/0186335 A1 Jul. 5, 2018

(30) Foreign Application Priority Data

Jan. 4, 2017 (TW) .............................. 106100212 A

(51) Int. Cl.
*B60R 25/33* (2013.01)
*B60R 25/102* (2013.01)
(Continued)

(52) U.S. Cl.
CPC ............ *B60R 25/33* (2013.01); *B60R 25/102* (2013.01); *B60R 25/305* (2013.01); *G01S 5/0263* (2013.01); *G01S 5/0294* (2013.01)

(58) Field of Classification Search
CPC ..... B60R 25/33; B60R 25/102; B60R 25/305; G01S 5/0263; G01S 5/0294;
(Continued)

(56) References Cited

U.S. PATENT DOCUMENTS 8,260,533 B2    9/2012 Matsur
8,756,225 B1 *  6/2014 Lipkin .............. G06F 17/30893
                                                          707/726
(Continued)

FOREIGN PATENT DOCUMENTS

CN    101465033    6/2009
CN    102768359    11/2012
(Continued)

OTHER PUBLICATIONS

"Office Action of Taiwan Counterpart Application," dated Jul. 24, 2017, p. 1-p. 6.
(Continued)

*Primary Examiner* — Orlando Bousono
(74) *Attorney, Agent, or Firm* — JCIPRNET

(57) ABSTRACT

An object tracking system including a plurality of electronic devices and a server platform is provided. The server platform generates a tracking message based on received event message, and sends the tracking message to at least one of the electronic devices located within a first predetermined range corresponding to the received event message. When one of the electronic devices detects a vehicle matched with one or more vehicle features of the event message according to the received tracking message, the one of the electronic devices generates and sends a notification message to the server platform.

16 Claims, 8 Drawing Sheets

(51) Int. Cl.
*G01S 5/02* (2010.01)
*B60R 25/30* (2013.01)

(58) Field of Classification Search
CPC ..... G06F 21/552; G06N 5/025; H04L 41/069; H04L 43/04; H04L 43/16
See application file for complete search history.

(56) References Cited

U.S. PATENT DOCUMENTS

| | | | |
|---|---|---|---|
| 9,530,310 | B2 | 12/2016 | Evanitsky et al. |
| 2003/0163289 | A1* | 8/2003 | Whelan ............ G08B 13/19641 702/188 |
| 2005/0093683 | A1 | 5/2005 | Wee et al. |
| 2007/0294056 | A1* | 12/2007 | Maskall ................. G06Q 10/00 702/186 |
| 2010/0011068 | A1* | 1/2010 | Jain .......................... G06F 15/16 709/206 |
| 2010/0138298 | A1* | 6/2010 | Fitzgerald ................ G06F 21/88 705/14.53 |
| 2012/0131185 | A1* | 5/2012 | Petersen ............... H04L 41/069 709/224 |
| 2013/0150028 | A1 | 6/2013 | Akins et al. |
| 2013/0297604 | A1* | 11/2013 | Sutedja ................. G06Q 10/107 707/737 |
| 2014/0012796 | A1* | 1/2014 | Petersen ............... H04L 41/069 706/47 |
| 2015/0124099 | A1 | 5/2015 | Evanitsky et al. |
| 2015/0161877 | A1 | 6/2015 | Hämäläinen et al. |
| 2015/0244823 | A1* | 8/2015 | Lim ........................ H04L 67/26 709/203 |
| 2015/0319116 | A1* | 11/2015 | Chavali ............... H04L 12/1895 709/206 |
| 2016/0042637 | A1* | 2/2016 | Cahill .................... G08B 25/10 701/3 |
| 2016/0198128 | A1 | 7/2016 | Wang et al. |

FOREIGN PATENT DOCUMENTS

| | | |
|---|---|---|
| CN | 103419750 | 12/2013 |
| JP | 2002046578 | 2/2002 |
| JP | 2006035990 | 2/2006 |
| JP | 2009169540 | 7/2009 |
| JP | 2013060032 | 4/2013 |
| JP | 2013516853 | 5/2013 |
| JP | 2014191664 | 10/2014 |
| TW | M353434 | 3/2009 |
| TW | 201233575 | 8/2012 |
| TW | I397866 | 6/2013 |
| TW | I424146 | 1/2014 |
| TW | I455072 | 10/2014 |
| TW | I459332 | 11/2014 |
| TW | 201631557 | 9/2016 |
| WO | 2005071634 | 8/2005 |
| WO | 2016132769 | 8/2016 |

OTHER PUBLICATIONS

Ahmad Fuad et al., "Remote vehicle tracking system using GSM Modem and Google map", Sustainable Utilization and Development in Engineering and Technology, May 2013, 15-19.

Zhigang Liu et al., "Vehicle anti-theft tracking system based on Internet of things", Vehicular Electronics and Safety (ICVES), 2013 IEEE International Conference on, Jul. 2013, 48-52.

Hu Jian-ming et al., "Automobile Anti-theft System Based on GSM and GPS Module", Intelligent Networks and Intelligent Systems (ICINIS), 2012 Fifth International Conference on, Nov. 2012, 199-201.

Mukherjee et al., "Anti-theft vehicle tracking and immobilization system", Power, Control and Embedded Systems (ICPES), 2014 International Conference on, Dec. 2014, 1-4.

Weifeng Zhong et al., "The Design of Vehicle Anti-Theft System Based on the Improved D-S Evidence Theory", 2014 8th International Conference on Future Generation Communication and Networking, Dec. 2014, 84-87.

Wenhao Lu et al., "Vehicle detection and tracking in relatively crowded conditions", Systems, Man and Cybernetics, 2009. SMC 2009. IEEE International Conference on, Oct. 2009, 4136-4141.

Nayan Jeevagan et al., "RFID Based Vehicle Identification During Collisions", Global Humanitarian Technology Conference, Aug. 2014, 716-720.

"Office Action of Japan Counterpart Application," dated Jul. 10, 2018, pp. 1-4.

* cited by examiner

OBJECT TRACKING SYSTEM AND METHOD THEREWITH

CROSS-REFERENCE TO RELATED APPLICATION

This application claims the priority benefit of Taiwan application serial no. 106100212, filed on Jan. 4, 2017. The entirety of the above-mentioned patent application is hereby incorporated by reference herein and made a part of this specification.

BACKGROUND OF THE DISCLOSURE

Field of the Disclosure

The disclosure relates to an object tracking system and a method therewith.

Description of Related Art

Some newly-developed technologies like a global positioning system (GPS) and a driving recorder have been widely applied in vehicles, so that when a vehicle theft event is occurred, the vehicle owner may track the vehicle through a location of the vehicle by the GPS, and the driving recorder may record a process of the event. However, if a professional thief steals a vehicle, and the thief may further destroy the GPS and the driving recorder in the vehicle, the tracking information cannot be obtained from these technologies, so that the police and the vehicle owner cannot continue to track the stolen vehicle. Moreover, by a conventional method that the police deal with a theft case, the police can only investigate the case by watching the recorded data shown in the monitor manually, the efficiency for the investigation is not acceptable and satisfied. Therefore, a finding rate and a resolution rate of the stolen vehicle cannot be effectively increased.

SUMMARY OF THE DISCLOSURE

The disclosure is directed to an object tracking system and a method therewith, by which other electronic device is adopted to track an object, and retain image data of the event for related parties of the event.

One of exemplary embodiments of the disclosure provides an object tracking system including a plurality of electronic devices and a server platform. The server platform generates a tracking message based on a received event message, and sends the tracking message to at least one of the electronic devices located within a first predetermined range corresponding to the received event message. When at least one of the electronic devices detects an object matched with an event feature value of the event message according to the tracking message, the at least one of the electronic devices generates a notification message and sends the notification message to the server platform.

One of exemplary embodiments of the disclosure provides an electronic device adapted to an object tracking system, and the electronic device includes a communication unit, a positioning unit, an image capturing unit and a processing unit. The communication unit is configured to receive a tracking message from a server platform. The positioning unit is configured to capture a location stamp of the electronic device itself. The image capturing unit is configured to capture an environment image. The processing unit is configured to identify whether the environment image captured by the image capturing unit includes an object matched with an event feature value in the tracking message. When the processing unit identifies that the environment image includes the object, the processing unit generates a notification message, and instructs the communication unit to send the notification message to the server platform.

One of exemplary embodiments of the disclosure provides a service platform adapted to an object tracking system, and the service platform includes a communication unit and a processing unit. The communication unit is configured to receive an event message. The processing unit is configured to generate a tracking message according to the event message, and instructs the communication unit to send the tracking message to at least one electronic device in a first predetermined range corresponding to the event message.

One of exemplary embodiments of the disclosure provides an object tracking method includes following steps. An event message is received, and a tracking message is generated according to the event message. In the embodiment, the event message includes a location stamp and an event feature value. Then, the tracking message is sent to at least one electronic device located within a first predetermined range corresponding to the event message. When the at least one electronic device in the first predetermined range detects an object matched with the event feature value according to the tracking message, the at least one electronic device generates a notification message, and transmits the notification message to a server platform.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
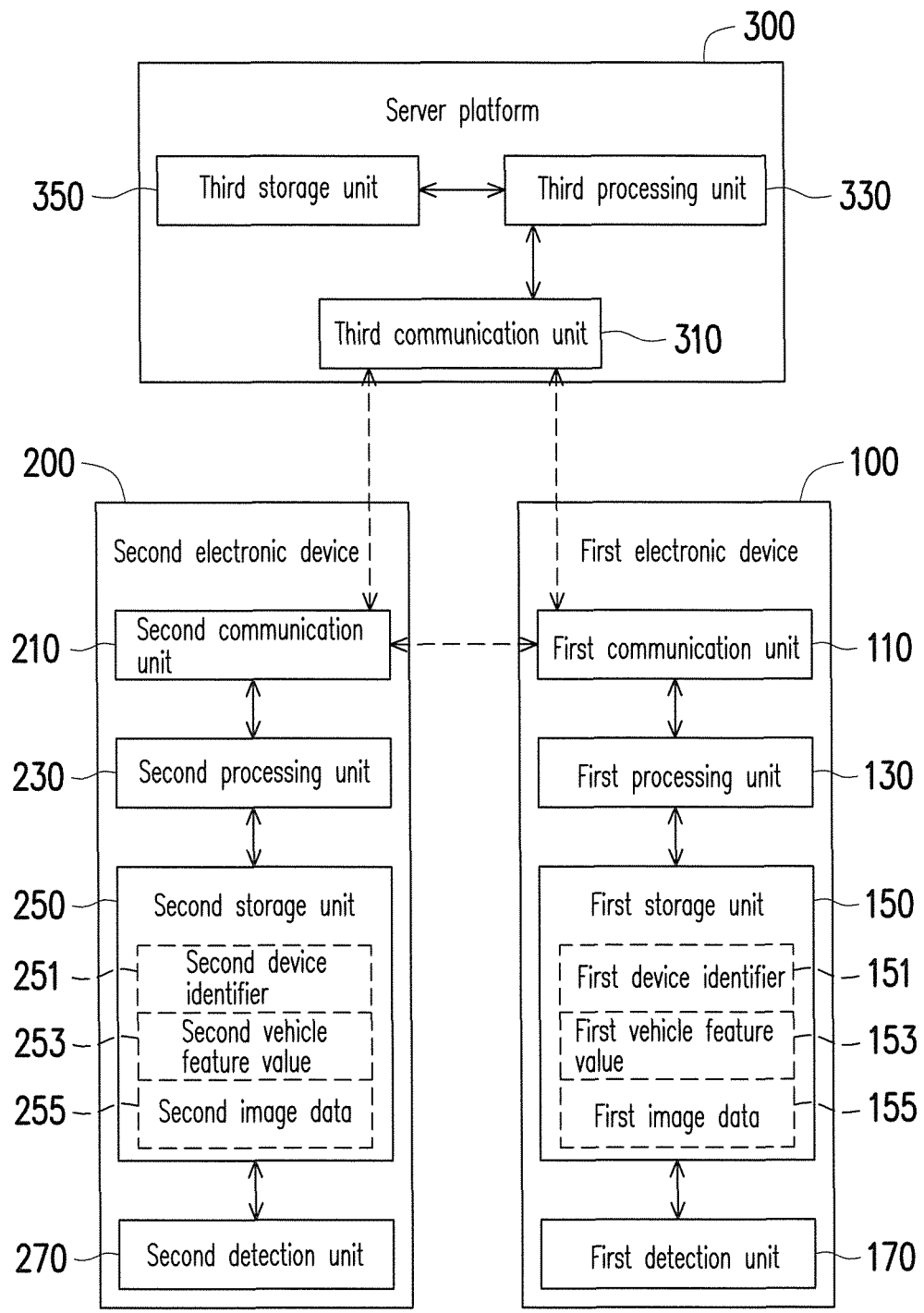
FIG. 1 is a block diagram of an object tracking system according to one of exemplary embodiments of the disclosure.

Embodiments of the present disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features. The terms used in describing the various embodiments of the disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

It will be understood that the terms such as "unit," "-er (-or)," and "module"described in the specification refer to an element for performing at least one function or operation, and may be implemented in hardware, software, or the combination of hardware and software.

One of exemplary embodiments of the disclosure provides an object tracking system including a plurality of electronic devices and a server platform. The server platform generates a tracking message based on a received event message, and sends the tracking message to at least one of the electronic devices located within a first predetermined range corresponding to the event message. When at least one of the electronic devices detects an object matched with an event feature value of the event message according to the tracking message, the one of the electronic devices generates a notification message and sends the notification message to the server platform.

In some of exemplary embodiments of the disclosure, the server platform may include a server or a family of servers that includes the hardware and operating system. The server platform is often used as a back-end server, which is connected via a network to a variety of terminal or workstation, and to respond to access requests by terminal or workstation by running various processes, thus achieving the corresponding business and data processing. In addition, the server platform usually needs to connect to one or more external systems. These external systems are stored in the corresponding database. Server platform can further communicate with these external systems to obtain data in which the stored information, enabling data exchange between them.

One of exemplary embodiments of the disclosure provides an electronic device which is adapted to an object tracking system. The electronic device includes a communication unit, a positioning unit, an image capturing unit and a processing unit. The communication unit is configured to receive a tracking message from a server platform. The positioning unit is configured to capture location stamp of the electronic device itself. The image capturing unit is configured to capture an environment image. The processing unit is configured to identify whether the environment image captured by the image capturing unit includes an object matched with an event feature value in the tracking message. When the processing unit identifies that the environment image includes the object, the processing unit generates a notification message, and instructs the communication unit to send the notification message to the server platform.

One of exemplary embodiments of the disclosure provides a service platform which is adapted to an object tracking system. The service platform is established in, for example, a computer server. The computer server includes a communication unit and a processing unit. The communication unit is configured to receive an event message. The processing unit is configured to generate a tracking message according to the event message, and instructs the communication unit to send the tracking message to at least one electronic device in a first predetermined range corresponding to the event message.

One of exemplary embodiments of the disclosure provides an object tracking method. In the object tracking method, an event message is received, and a tracking message is generated according to the event message. In the embodiment, the event message includes a location stamp and an event feature value. Then, the tracking message is sent to at least one electronic device located within a first predetermined range corresponding to the event message. When the at least one electronic device in the first predetermined range detects an object matched with the event feature value according to the tracking message, the at least one electronic device generates a notification message, and transmits the notification message to the server platform.

According to the object tracking system and the method therewith provided by exemplary embodiments of the disclosure, when the object is detected, other electronic device can be used to provide a location stamp (a location where the event is occurred) obtained when the object is detected to the server platform. The server platform may keep updating the location of the object according to the location stamp obtained when the object is detected, and send a tracking message used for seeking the object to the electronic devices around the latest location of the object, so as to keep tracking the object. Moreover, when the other electronic devices detect the object, the other electronic devices may retain image data related to the object. In this way, when it is required to track the object, related person of the event may track the location of the object and retain files related to the event with assistance of the other electronic devices.

FIG. 1 is a block diagram of an object tracking system according to one of exemplary embodiments of the disclosure.

In some exemplary embodiments of the disclosure, the object tracking system can be used to track a stolen vehicle. In detail, when a vehicle theft event is occurred, the vehicle owner and the police may track the stolen vehicle by using the object tracking system and the object tracking method. Therefore, even if a GPS and a driving recorder of the vehicle are destroyed by the thief, the vehicle owner and the police may still seek for the stolen vehicle through the electronic devices around the stolen vehicle, and retain voice files related to the stolen vehicle. In descriptions of the following embodiments, the object is, for example, a stolen vehicle; however, the disclosure is not limited to track the stolen vehicle.

In the embodiment, a method of continually tracking a stolen vehicle through other electronic devices in case that the GPS and the driving recorder on the stolen vehicle are destroyed is described below. To facilitate description, a first electronic device 100 and a second electronic device 200 are distinguished through whether a theft event is occurred. The first electronic device 100 is an electronic device installed on the stolen vehicle (i.e. the object to be tracked), and the second electronic device 200 is an electronic device assisting to track the stolen vehicle. However, when the vehicle installed with the first electronic device 100 does not have the theft event, the first electronic device 100 can be used as the second electronic device 200.

Referring to FIG. 1, the object tracking system 1000 includes the first electronic device 100, the second electronic device 200 and a server platform 300.

As an exemplary example, the first electronic device 100 and the second electronic device 200 mentioned in the following embodiment may have a function of communicating with other electronic devices, and are capable of capturing image, for example, taking pictures or recording a video. In a plurality of embodiments, the first electronic device 100 is a driving recorder having a communication function. The first electronic device 100 is installed on the vehicle to record driving images of the vehicle. The second electronic device 200 can be a driving recorder installed on a vehicle, a camera monitor set on a roadside or other electronic device having the image capturing and communication functions. In the exemplary embodiment, the second electronic device 200 is, for example, a driving recorder having the communication function that is installed on a vehicle, though the disclosure is not limited thereto.

In the exemplary embodiment, the first electronic device 100 includes a first communication unit 110, a first processing unit 130, a first storage unit 150 and a first detection unit 170. The second electronic device 200, in the exemplary embodiment, includes a second communication unit 210, a second processing unit 230, a second storage unit 250 and a second detection unit 270.

The first communication unit 110 and the second communication unit 210 can be communication chips or integrated circuits with communication functions. The communication chips or integrated circuits support one of a global system for mobile communication (GSM) system, a personal handy-phone system (PHS), a code division multiple access (CDMA) system, a wireless fidelity (WiFi) system, a worldwide interoperability for microwave access (WiMAX) system, a third generation (3G) wireless communication technique, a long term evolution (LTE) technique, and a dedicated short range communication (DSRC) technique or a combination thereof.

The first processing unit 130 and the second processing unit 230 can be respectively a central processing unit (CPU), a microprocessor, an application specific integrated circuits (ASIC), a programmable logic device (PLD) or other similar devices.

The first storage unit 150 and the second storage unit 250 can be respectively a memory storage device such as a secure digital (SD) card, a multimedia card (MMC), a memory stick, a compact flash (CF) card, an embedded MMC (eMMC) card or a solid state disk (SSD), etc. In one or a part of the exemplary embodiments, the first storage unit 150 and the second storage unit 250 respectively store a first device identifier 151, a first vehicle feature value 153, a first image data 155 and a second device identifier 251, a second vehicle feature value 253 and a second image data 255.

The first device identifier 151 and the second device identifier 251 are unique identifiers used for identifying the first electronic device 100 and the second electronic device 200, and serve as login codes of the object tracking system 1000. The specification of the identifier is not limited by the disclosure, for example, the identifier can be a license plate of the vehicle configured with the electronic device, a media access control address (MAC) of a communication unit, or a unique identifier assigned by a manufacturer or the server platform 300.

The first vehicle feature value 153 and the second vehicle feature value 253 are used for recording features of vehicles installed with the first electronic device 100 and the second electronic device 200. In the embodiment, the first vehicle feature value 153 and the second vehicle feature value 253 respectively include a license plate number of the vehicle, and may additionally include a vehicle color, a vehicle type, a vehicle size, a vehicle model number, a vehicle pattern, etc., or a combination thereof, though the disclosure is not limited thereto. It should be noted that if the second electronic device 200 is a road monitor installed by the roadside, the second electronic device 200 does not have information related to the vehicle feature value.

The first image data 155 and the second image data 255 are environment images captured by the first detection unit 170 and the second detection unit 270 in an environment respectively surrounding the first detection unit 170 and the second detection unit 270. In the exemplary embodiment, since the first electronic device 100 and the second electronic device 200 are all, for example, driving recorders having the communication function and installed in the vehicles, the first image data 155 and the second image data 255 can be dynamically updated image data, and file sizes thereof are different according to different setting time.

In a plurality of the exemplary embodiments, the first detection unit 170 may include multiple functions such as an image capturing function, a positioning function and/or an anti-theft function, etc., or a combination thereof adjusted according to an actual requirement. In one of the exemplary embodiments, the first detection unit 170 may respectively have an image capturing unit, a positioning unit and a dark current power-off detection unit to achieve the image capturing function, the positioning function and the anti-theft function. For example, the image capturing unit configured in the first detection unit 170 may continually capture the environment images around the electronic device, and respectively store the captured environment images in the first storage unit 150. The positioning unit configured in the first detection unit 170 may be a chip supporting the global positioning system (GPS), and may provide a location stamp of the first electronic device 100. The dark current power-off detection unit may detect whether the power of the first electronic device 100 is turned off (for example, the electronic device is unplugged or destroyed to cause the power of the electronic device being turned off). Moreover, when the electronic device is turned off, the dark current power-off detection unit may provide a tiny or very small current to send a detected event message to the server platform 300. The aforementioned image capturing unit, the positioning unit and the dark current power-off detection unit can be implemented by physical circuitry components or integrated chips in collaboration with peripheral devices such as peripheral circuits or camera devices, etc. In another embodiment, the aforementioned image capturing unit, the positioning unit and the dark current power-off detection unit can also be implemented by using a microprocessor, an Application-specific integrated circuit (ASIC) or a Programmable Logic Device (PLD) or other similar devices to execute a plurality of instructions in collaboration with peripheral devices such as peripheral circuits or camera devices, etc.

In a plurality of exemplary embodiments, the second detection unit 270 may include multiple functions such as the image capturing function, the positioning function and/or the anti-theft function, etc., or a combination thereof adjusted according to an actual requirement. In the embodiment, since the second electronic device 200 is installed in a vehicle and is a driving recorder having the communication function, the second detection unit 270 may respectively use an image capturing unit, a positioning unit and a dark current power-off detection unit to achieve the image capturing function, the positioning function and the anti-theft function. The image capturing unit, the positioning unit and the dark current power-off detection unit are as that described above, and details thereof are not repeated. If the second electronic device 200 is a road monitor installed by the roadside, the second detection unit 270 configured in the second electronic device 200 does not necessarily require the positioning unit and the dark current power-off detection unit.

The server platform 300 is, for example, a cloud server, and has a function of processing and storing a large amount of data, and may communicate with the first electronic device 100 and the second electronic device 200 through a wired or wireless network. In the exemplary embodiment, since the first electronic device 100 and the second electronic device 200 are all driving recorders having the communication function, the server platform 300 communicates with the first electronic device 100 and the second electronic device 200 through a wireless network. In another embodiment, the server platform 300 may also communicate with the first electronic device 100 and the second electronic device 200 through a backbone network in collaboration with the wireless network. In another embodiment, if the second electronic device 200 is a camera monitor configured by the roadside, or other fixed-type electronic device having the image capturing and communication functions, the server platform 300 may communicate with the second electronic device 200 through a wired network.

In one of exemplary embodiments, the server platform 300 includes a third communication unit 310, a third processing unit 330 and a third storage unit 350. The third communication unit 310 is a communication chip having a wireless and/or wired communication function or a processor installed with aforesaid function, the third processing unit 330 is a single or multiple general desktop computer CPUs connected in series or a server CPU (for example, an Intel Xeon series CPU or an AMD Opteron series CPU) with powerful multiplexing performance, and the third storage unit 350 is a disk array having a large storage capacity and a data protection function.

Operation methods of the internal units of the first electronic device 100, the second electronic device 200 and the server platform 300 are described in detail below.

To be specific, when the vehicle configured with the first electronic device 100 is stolen, the first detection unit 170 may transmit detected data to the first processing unit 130, and the first processing unit 130 generates a first event message according to the detected data, and instructs the first communication unit 110 to transmit the first event message to the second communication unit 210 of the second electronic device 200 and the third communication unit 310 of the server platform 300. In an embodiment, the first electronic device 100 transmits the first event message to the second electronic device 200 through a broadcasting manner. In another exemplary embodiment, the first electronic device 100 may transmit the first event message to the second electronic device 200 through the server platform 300. In a plurality of embodiments, the first event message is transmitted to the server platform 300 by the first communication unit 110 through a method supporting, for example, a GSM system, a personal handy-phone system (PHS), a code division multiple access (CDMA) system, a WiFi system, a worldwide interoperability for microwave access (WiMAX) system, a 3G wireless communication technique, a long term evolution (LTE) technique, a dedicated short-range communications (DSRC) technique, etc.

After the second communication unit 210 of the second electronic device 200 receives the first event message, the second communication unit 210 generates a second event message, and transmits a second event message to the third communication unit 310 of the server platform 300. As described above, one second electronic device 200 is illustrated in the figures of the embodiment. In an actual application, a plurality of second electronic devices 200 can be adopted, and a part of the second electronic devices 200 can be driving recorders installed on vehicles and having the communication function, and a further part of the second electronic devices 200 can be camera monitors set by the roadside or other fixed-type electronic devices having the image capturing and communication functions, which is not limited by the disclosure.

The third processing unit 330 of the server platform 300 may generate a tracking message according to the first event message and the second event message received by the third communication unit 310, and sends the tracking message to the second communication units 210 of a plurality of the second electronic devices 200 around the first electronic device 100. If the second detection unit 270 of any one of the second electronic device 200 detects the stolen vehicle according to the tracking message, the second processing unit 230 of the second electronic device 200 may generate a notification message, and instructs the second communication unit 210 to transmit the notification message to the third communication unit 310 of the server platform 300. The third communication unit 310 of the server platform 300 may send the tracking message to the second communication unit 210 according to a location stamp in the notification message. The second electronic devices 200 around the first electronic device 100 mentioned in the exemplary embodiment refer to a plurality of second electronic devices 200 located within a predetermined setting range of the first electronic device 100. In an exemplary embodiment, the predetermined setting range can be a broadcasting coverage range of the first communication unit 110 of the first electronic device 100. In another exemplary embodiment, the predetermined setting range can be a circle with a radius of a predetermined distance formed by taking a positioning information provided by the detection unit 170 of the first electronic device 100 as a center. In the aforementioned exemplary embodiment, the design of the predetermined setting range can be adjusted according to stolen vehicle detection capability of the second detection units 270 of the second electronic devices 200, and can be varied according to an actual requirement of an actual application, which is not limited by the disclosure.

The messages of the disclosure are introduced in detail below. To be specific, the messages include the first event message, the second event message, the third event message, the tracking message and the notification message.

The first event message and the third event message are used for notifying the theft event, which are initial messages related to the event. The first event message is sent by the first electronic device 100 installed on the stolen vehicle, and is sent to the server platform 300 and/or one or a plurality of second electronic devices 200 located adjacent to the first electronic device 100. The third event message is sent by a user, namely, the user may input the third event message through a wired/wireless network (for example, by using a mobile phone, a tablet PC, a PC to connect the network), so as to notify the theft event.

The second event message is used to assist notifying the theft event when the theft event is just happened. The second event message is sent by the second electronic device 200, and is sent to the server platform 300.

The tracking message is sent to the second electronic devices 200 located adjacent to the first electronic device 100 by the server platform 300, so as to request the adjacent second electronic devices 200 to assist tracking the stolen vehicle.

The notification message is sent to the server platform 300 by the second electronic device 200 when the second electronic device detects the stolen vehicle according to the tracking message, so as to reply the tracking message.

Figure 2:
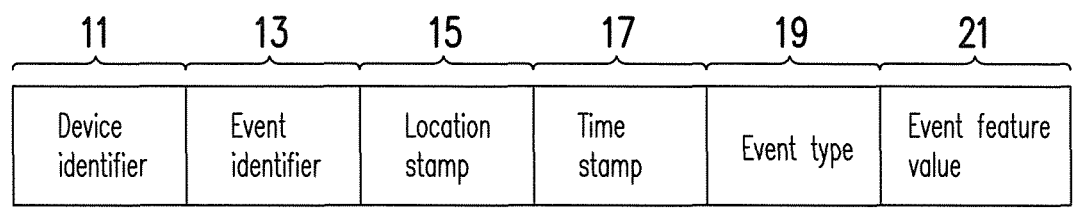
FIG. 2 is a schematic diagram of fields included in a message according to one of exemplary embodiments of the disclosure.

FIG. 2 is a schematic diagram of fields included in a message according to one of exemplary embodiments of the disclosure. In the embodiment, generally, the first event message, the second event message, the third event message, the tracking message and the notification message may have at least a part of fields or related information of the message 101 shown in FIG. 2, though the disclosure is not limited thereto.

Referring to FIG. 2, the message 101 has a device identifier 11, an event identifier, a location stamp 15, a time stamp 17, an event type 19 and an event feature value 21.

The device identifier 11 and the event identifier 13 respectively represent an identifier of the electronic device sending the message and an identifier of the first electronic device 100 encountered the theft event. Since each of the electronic devices has a unique identifier, when the device identifier 11 and the event identifier 13 are the same, it represents that the message is sent by the stolen vehicle, i.e. the message is the first event message.

The location stamp 15 records a location where the event corresponding to the message is occurred, and in the embodiment, the location stamp 15 is represented by, for example, longitude and latitude. The time stamp 17 records a time when the event corresponding to the message is occurred. It should be noted that the event corresponding to the message refers to an event triggering the message, which is not necessarily a theft event. For example, when the message is the first event message, the location stamp 15 and the time stamp 17 respectively record a location and a time where/when the first electronic device 100 generates the first event message, i.e. the location and the time where/when the theft event is occurred. However, when the message is the second event message, the location stamp 15 and the time stamp 17 respectively record a location and a time of the second electronic device 200 when the second electronic device 200 receives the first event message and generates the second event message. When the message is the third event message, the location stamp 15 and the time stamp 17 respectively record a location and a time of the theft event input by the user. Alternatively, when the message is the notification message, the location stamp 15 and the time stamp 17 respectively record a location and a time of the second electronic device 200 when the second electronic device 200 detects the first electronic device 100 and generates the notification message.

The event type 19 records a type of the event, for example, theft. The event feature value 21 records a feature value of the vehicle corresponding to the event. For example, a vehicle licensee plate, a vehicle color, a vehicle size, a vehicle type, a vehicle model number or other recorded vehicle features. In the embodiment, the event feature value 21 is a feature value of the stolen vehicle corresponding to the theft event, i.e. the first vehicle feature value 153 stored in the first storage unit 150.

It should be noted that the message of the disclosure is not limited to the fields shown in FIG. 2, and the fields of the first event message, the second event message, the third event message, the tracking message and the notification message are not necessarily to be totally the same. For example, if the message is the tracking message, since a location of the server platform 300 is not directly related to assist searching the vehicle, and the server platform 300 may directly send the tracking message to a plurality of the second electronic devices 200 in a specific range, the field of the location stamp 15 in the tracking message is not necessary, and the field of the location stamp 15 can be omitted, or the field of the location stamp 15 can be set to null.

FIG. 3A to FIG. 3D are schematic diagrams illustrating a vehicle tracking method according to one of exemplary embodiments of the disclosure.

In the embodiment, the first electronic device 100 is stolen, and is moved along a path R1.

Figure 3A:
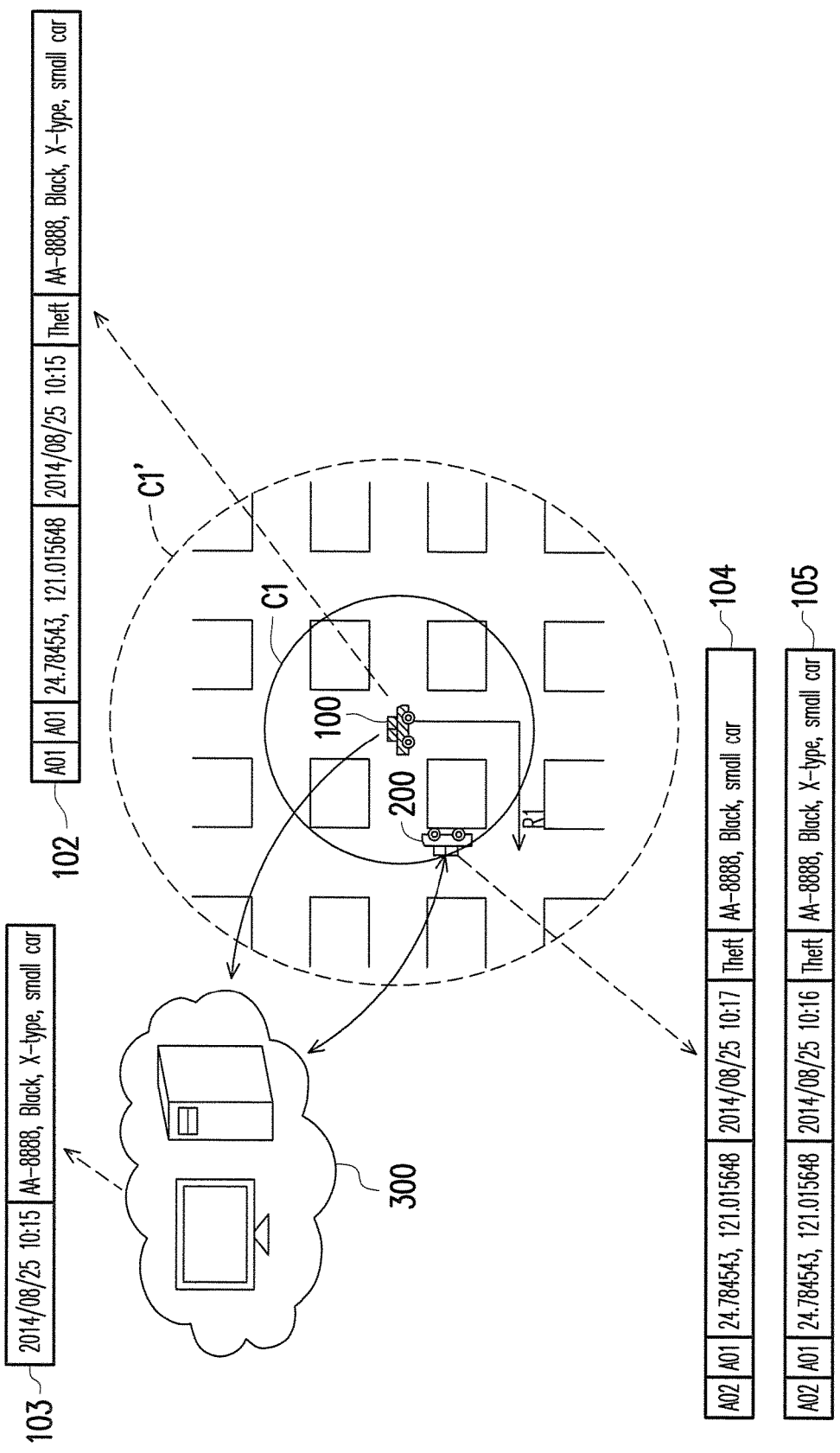
FIG. 3A to FIG. 3D are schematic diagrams illustrating an object tracking method according to one of exemplary embodiments of the disclosure.
Figure 3B:
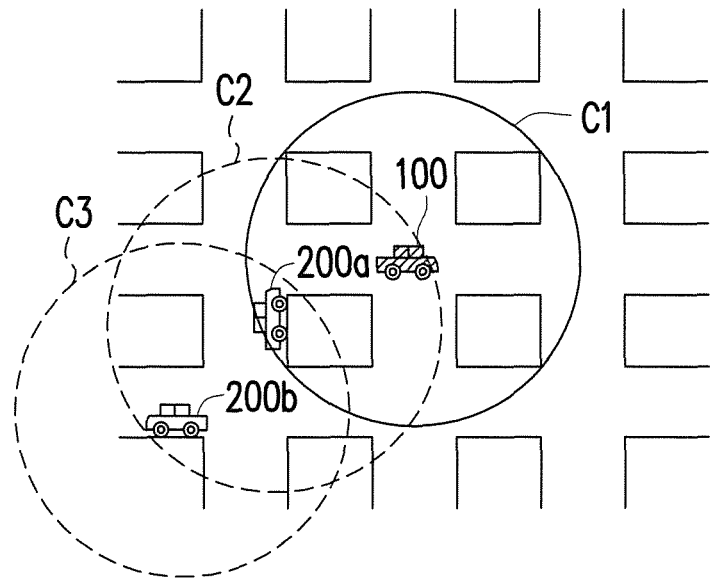

Referring to FIG. 3A, when the first electronic device 100 is stolen, the first electronic device 100 generates and sends a first event message 102 to the server platform 300.

In the first event message 102 of the exemplary embodiment, a value of the device identifier 11 is A01, which is a login value of the first electronic device 100 on the server platform 300. Since the stolen vehicle is the first electronic device 100 itself, the values of the device identifier and the event identifier are the same, which are all A01. The location stamp and the time stamp are generated according to a location and a time where/when the theft event is occurred. And the event feature value records a license plate number, a vehicle color and a vehicle model number of the stolen first electronic device 100. It should be noted that in other embodiment, if the event identifier 13 is directly set as the license plate number of the first electronic device 100, the field of the event feature value may only record the vehicle color and the vehicle model number of the first electronic device 100, so as to reduce a transmitted data amount.

When the server platform 300 receives the first event message 102 from the first electronic device 100, and generates a tracking message 102 according to the first event message 102, the server platform 300 sends the tracking message 103 to the second electronic devices 200 located adjacent to the first electronic device 100.

In the exemplary embodiment, the server platform 300 takes the location stamp in the first event message 102 as a center to define a first predetermined range C1. For example, the first predetermined range C1 is a circle with a radius of 2 kilometres formed by taking the location stamp of the first event message 102 as a center. However, a setting standard of the first predetermined range is not limited by the disclosure, and in other embodiments, the first predetermined range can be a circle with a radius of 3 kilometres, or a square with a side length of 6 kilometres, or any closed shape set by the user. The electronic devices within the first predetermined range C1 are regarded as the second electronic devices located adjacent to the first electronic device 100, and the server platform 300 sends the tracking message 103 to the adjacent second electronic devices, for example, the second electronic device 200. In an exemplary embodiment, the first predetermine range C1 mentioned in the exemplary embodiment can be designed according to a broadcasting coverage range of the first communication unit 110 of the first electronic device 100. In another exemplary embodiment, the first predetermined range C1 can be a circle with a radius of a predetermined distance formed by taking positioning information provided by the first electronic device 100. In the aforementioned exemplary embodiment, the design of the first predetermined range C1 can be adjusted according to stolen vehicle detection capability of the second electronic device 200, and can be varied according to an actual requirement of an actual application, which is not limited by the disclosure In the exemplary embodiment, since the server platform 300 directly sends the tracking message 103 to the electronic devices located within the first predetermined range C1, and the electronic devices receiving the tracking message 103 are only in charge of detecting whether there is a vehicle matched with the event feature value around, the focus of the tracking message 103 is only the event feature value of the stolen vehicle. In order to save a transmission data amount, the tracking message 103 of the embodiment only includes the fields of the time stamp and the event feature value.

After the second electronic device 200 receives the tracking message 103, the second electronic device 200 detects whether there is a vehicle matched with the event feature value of the tracking message 103 around. When the vehicle matched with the event feature value is detected, the second electronic device 200 transmits back a notification message 104 to the server platform 300.

In the exemplary embodiment, the event feature value is a first vehicle feature value 153, and is set as that the license plate number is "AA-8888", the vehicle color is black, and the vehicle model number is X, and the vehicle type is small car. When the second electronic device 200 detects whether there is a vehicle matched with the event feature value, it is unnecessary to completely match all of the features of the event feature value. For example, when the second electronic device 200 detects the vehicle with the license plate number of "AA-8888", or when the second electronic device 200 detects a black small car, the second electronic device 200 all sends the notification message 104 to the server platform 300. Namely, when the second electronic device 200 detects whether there is a vehicle matched with the event feature value around, the second electronic device 200 is only required to detect whether the vehicle is matched with one of the field in the event feature value, or matched with a specific combination of the fields, which is not limited by the disclosure.

In the exemplary embodiment, a value of the device identifier in the notification message 104 is A02, which is a login value of the second electronic device 200 on the server platform 300. The event identifier records the login value A01 of the stolen first electronic device 100. The location stamp and the time stamp respectively record a location and a time where/when the notification message 104 is generated. The event feature value records the features matched with the vehicle feature value detected by the second electronic device 200. For example, according to the notification message 104 of the embodiment, the suspicious vehicle detected by the second electronic device 200 is a black small car.

It should be noted that at the moment when the first electronic device 100 is stolen, besides that the first electronic device 100 may send the first event message 102 to the server platform 300, the first electronic device 100 may also broadcast the message to the electronic devices located adjacent to the first electronic device 100. For example, the first electronic device 100 may send the first event message 102 to a base station (which is not shown) communicating with the first electronic device 100, and the base station may broadcast the first event message 102 to all of the electronic devices located within a communication range of the base station. Alternatively, the first electronic device 100 may also directly broadcast the first event message 102 to the adjacent electronic devices through a short range transmission method (for example, by using the DSRC technique). When the adjacent electronic device, for example, the second electronic device 200 receives the first event message 102, the second electronic device 200 may transmit a second event message 105 to the server platform 300 to assist notifying the theft event.

The second event message 105 of the embodiment is configured to assist notifying the theft event. Therefore, the event identifier, the event type and the event feature value of the second event message 105 are the same with that of the first event message 102. A difference there between is that the second event message 105 is generated and sent by the second electronic device 200, so that the device identifier is the login value A02 of the second electronic device 200, and the location stamp and the time stamp respectively record a location and a time where/when the second event message 105 is generated.

After the server platform 300 receives the second event message 105, the server platform 300 also generates a tracking message. The method that the server platform 300 generates the tracking message is the same to the method that the server platform 300 generates the tracking message after receiving the first event message 102, which is not repeated.

It should be noted that in the exemplary embodiment, the event message received by the server platform 300 is the first event message 102 generated and sent by the stolen first electronic device 100, though the disclosure is not limited thereto. For example, when a user discovers that the vehicle is stolen, the user may also access the server platform 300 through the Internet, and log in a third event message (not shown). The server platform 300 may generate and send the tracking message to a second predetermined range corresponding to the third event message according to the third event message.

In the exemplary embodiment, the content of the third event message is the same with the content of the aforementioned first event message 102, and the fields of the tracking message, and the methods for generating and sending the tracking message have been described above, which are not repeated. However, since it generally takes a long time before the user discovers that the vehicle has been stolen, and the stolen vehicle is probably located far away from the place where the vehicle is stolen, if the event message received by the server platform 300 is the third event message logged by the user, the server platform 300 may take the location stamp of the third event message as a center and send the tracking message to the electronic devices located within the first predetermined range C1 with a wider range (for example, a circle with a radius of 5 kilometres formed by taking the location stamp of the third event message as a center), so as to increase a searching range.

FIG. 3A illustrates a process that a second electronic device 200a transmits the notification message after the first electronic device 100 sends the first event message. Then, referring to FIG. 3B, when the server platform 300 receives the notification message 104 from the second electronic device 200a, the server platform 300 obtains a location that the second electronic device 200a observes the suspicious vehicle according to the notification message 104. Then, the server platform 300 takes a location stamp of the notification message 104 as a center to send the tracking message 103 to the electronic devices located within a first predetermined range C2 of the location stamp.

After a second electronic device 200b located within the first predetermined range C2 corresponding to the notification message 104 receives the tracking message, the second electronic device 200b also detects whether the surrounding vehicles are matched with the event feature value in the tracking message 103. When the second electronic device 200b detects a vehicle matched with the event feature value in the tracking message 103, the second electronic device 200b sends a notification message to the server platform 300. The server platform 300 then takes a location stamp of the notification message sent by the second electronic device 200b as a center to send the tracking message 103 to the electronic devices located within a first predetermined range C3 corresponding to the notification message. Deduced by analogy, each time the server platform 300 takes the location of the electronic device transmitting back the notification message as a center to send the tracking message. In this way, the location stamps of the tracking messages may gradually form a path trajectory to continually track the stolen vehicle.

However, since the server platform 300 takes the location stamp of the received notification message as a center to send the tracking message, vehicles located at different directions may receive the tracking message and reply notification messages. Moreover, as described above, as long as a vehicle is matched with a part of the features in the event feature value, it is determined that the vehicle is matched with the event feature value. Therefore, during the process of tracking the stolen vehicle, a plurality of different tracking paths is probably formed.

Figure 3C:
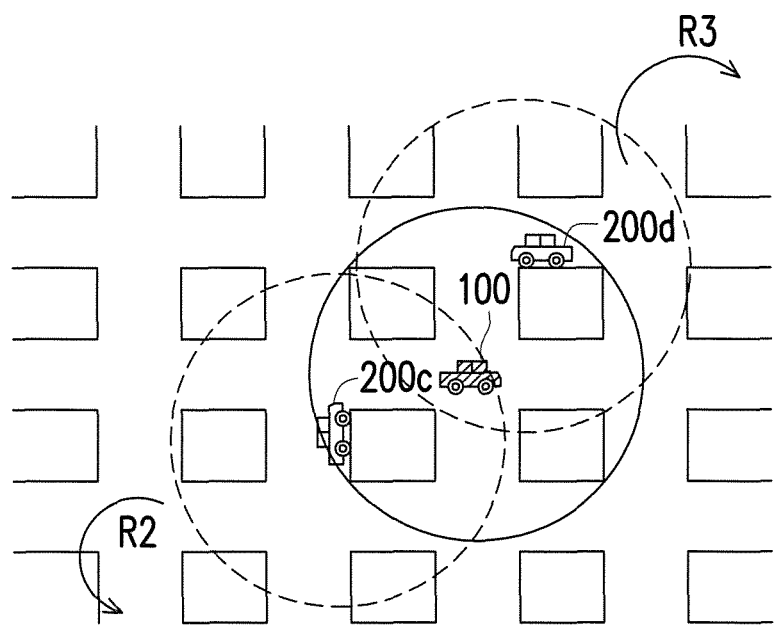

Referring to FIG. 3C, in the FIG. 3C, the second electronic devices 200c and 200d are all located within the first predetermined range C1 corresponding to the location stamp of the first event message. Therefore, when the first electronic device 100 sends the first event message, both of the second electronic devices 200c and 200d receive the first event message, and respectively send the second event messages to the server platform 300. Now, the server platform 300 respectively sends the tracking message to the electronic devices located within the respective first predetermined ranges corresponding to the second electronic devices 200c and 200d.

In the exemplary embodiment, both of the second electronic devices 200c and 200d identify vehicles with vehicle color, vehicle type or model number matched with the even feature value in the tracking message, for example, the second electronic device 200c detects an X-type vehicle, the second electronic device 200d detects a black small car, and both of the second electronic devices 200c and 200d transmit the notification messages to the server platform 300. After the server platform 300 receives the notification messages from the second electronic devices 200c and 200d, the server platform 300 respectively sends the tracking messages to the first predetermined ranges corresponding to the notification messages according to the location stamps of the notification messages of the second electronic devices 200c and 200d. After several times of sending the tracking messages, receiving the notification messages, paths R2 and R3 are finally formed. It should be noted that the paths R2 and R3 are two independent paths, and methods for forming the paths R2 and R3 can be learned according to the related description of FIG. 3A, and detail thereof is not repeated.

In the exemplary embodiment, actually, the direction of the second path R2 is a direction matched with the path R1 of the electronic device 100. Since the server platform 300 is unable to determine the direction matched with the direction of the first electronic device 100 according to the notification messages, both of the paths R2 and R3 are used for continually tacking. However, if any of the electronic devices on the path R2 detects the license plate number "AA-8888" of the first electronic device 100, and notifies the same in the notification message, the server platform 300 may immediately stop the tracking of the path R3 and the other paths. Namely, when the second electronic device detects the license plate number of the first electronic device 100, the server platform 300 only tracks the path on which the license plate number is identified.

Figure 3D:
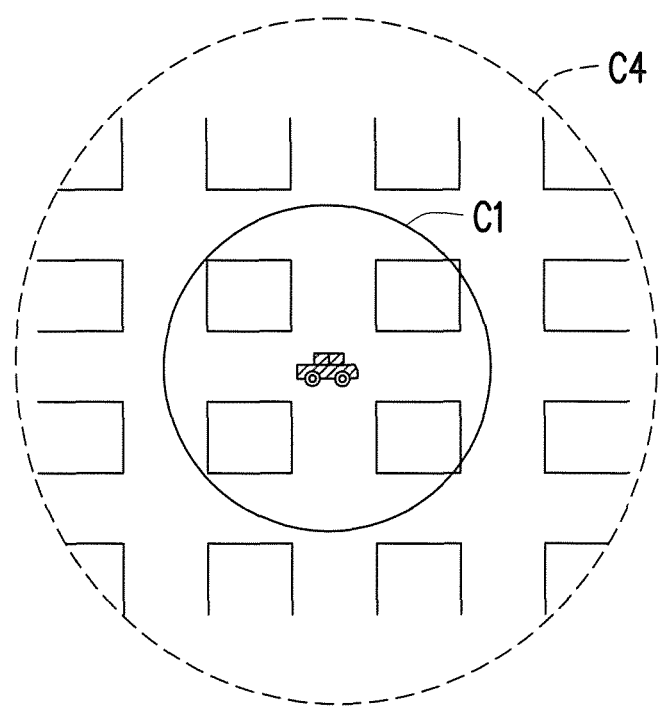

Referring to FIG. 3D, in the exemplary embodiment, when the server platform 300 sends the tracking message to the first predetermined range C1, if none of the second electronic devices reply the notification message, the server platform 300 may resend the tracking message to the second predetermined range C4, where the second predetermined range C4 is greater than the first predetermined range C1. In this way, the number of the second electronic devices assisting the tracking is increased, and the searching range is expanded.

Figure 4A:
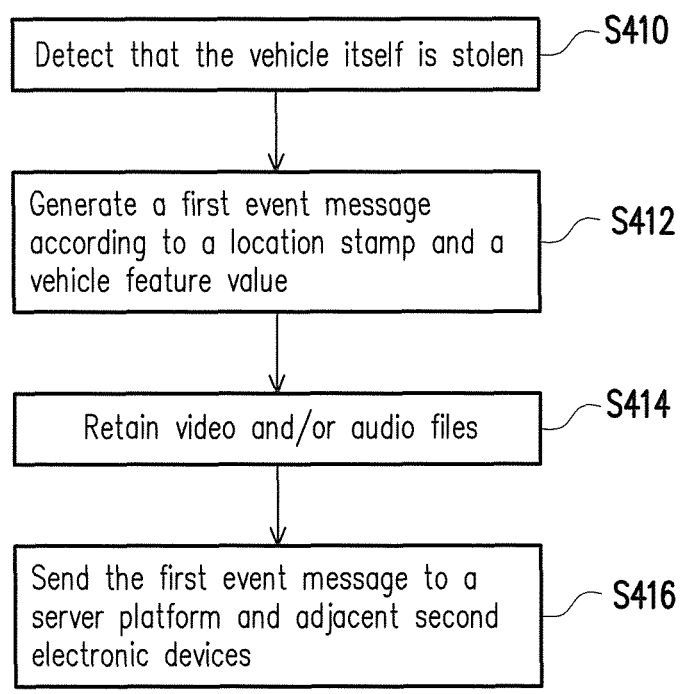
FIG. 4A to FIG. 4C are flowcharts illustrating an object tracking method according to one of exemplary embodiments of the disclosure.
Figure 4B:
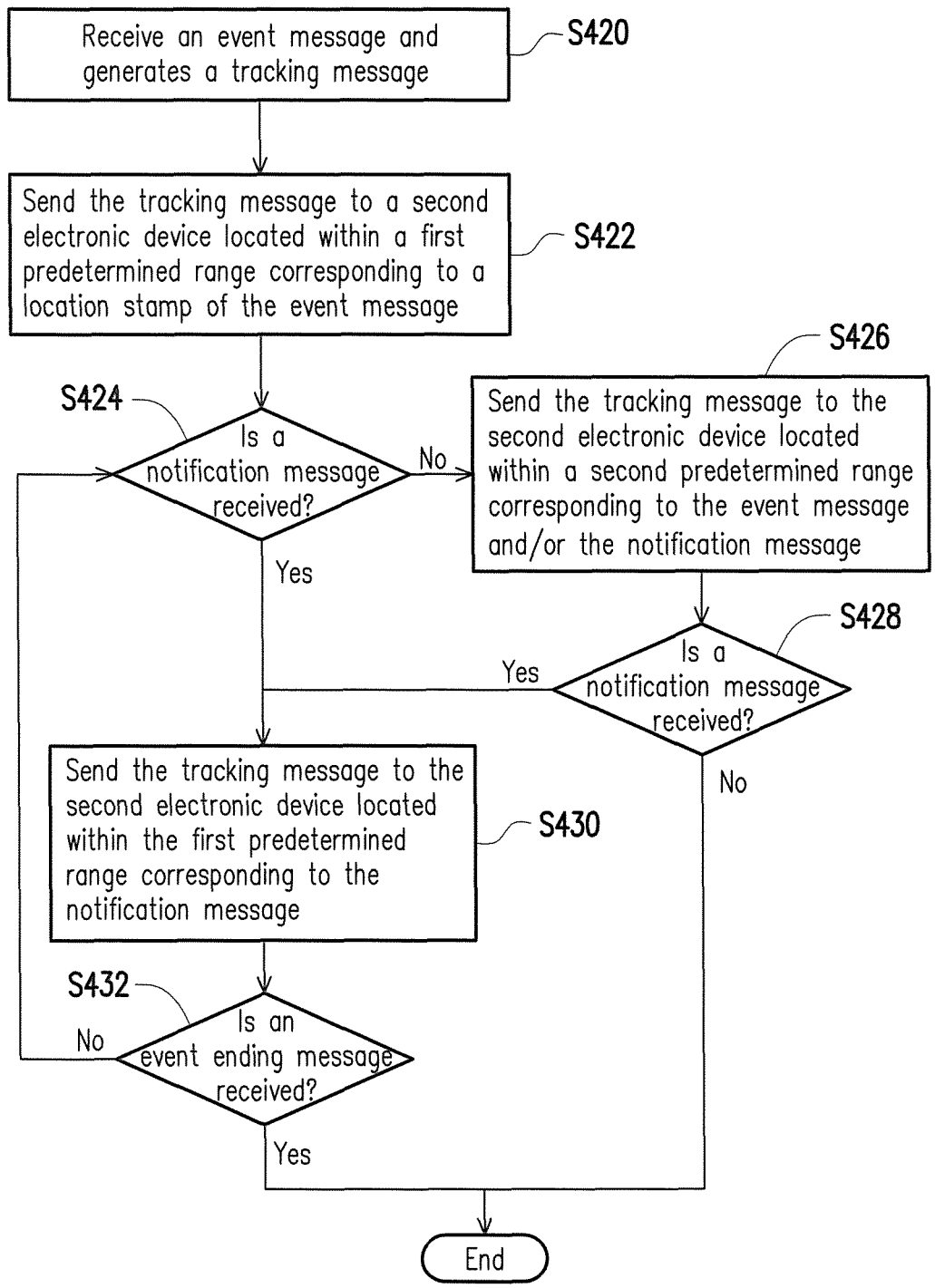
Figure 4C:
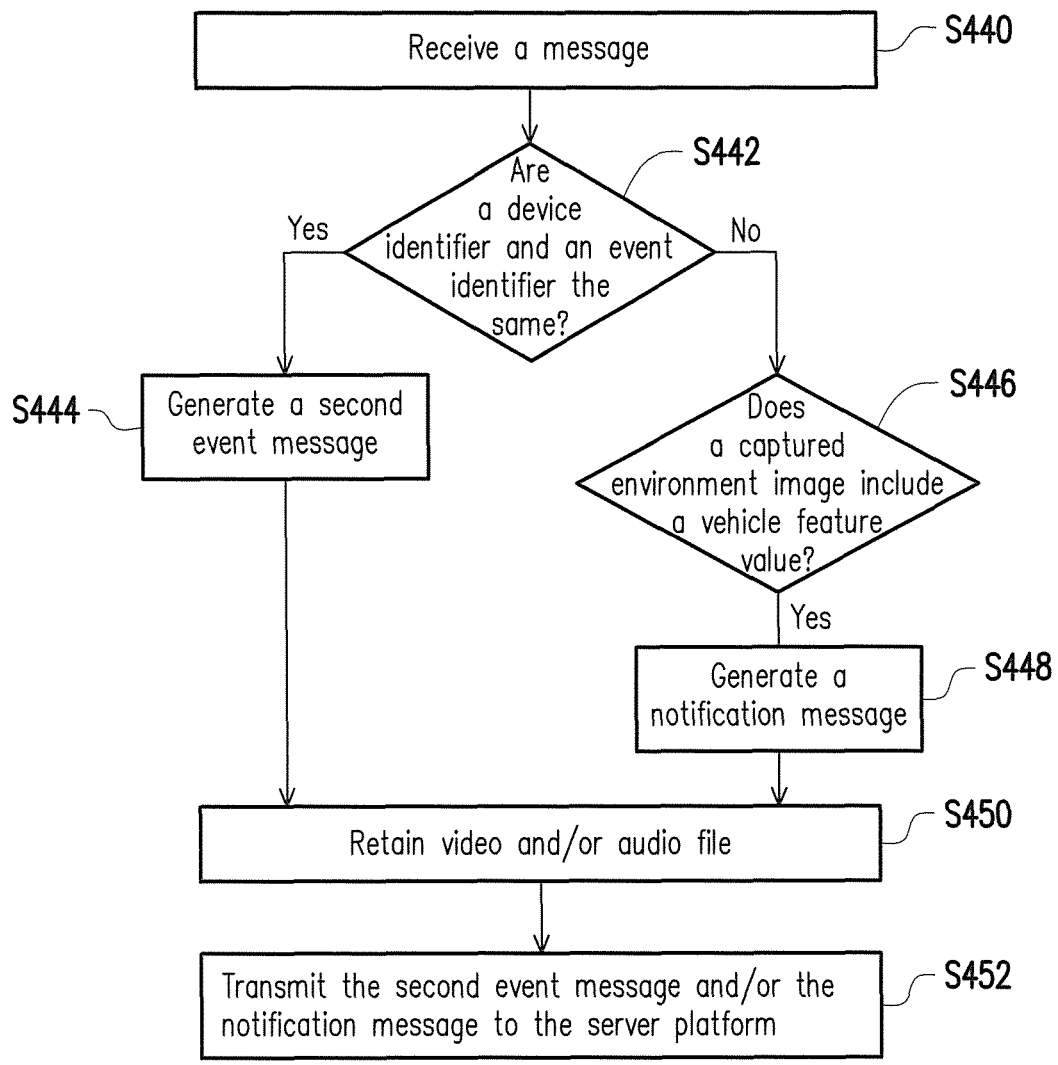

FIG. 4A to FIG. 4C are flowcharts illustrating an object tracking method according to one of exemplary embodiments of the disclosure.

Referring to FIG. 4A, in step S410, the first electronic device 100 detects that the vehicle itself is stolen. Then, in step S412, the first electronic device 100 captures a location stamp of the first electronic device 100, and generates the first event message according to the location stamp, the time stamp, the event type of "theft", and the first device identifier 151 and the first vehicle feature value 153 stored in the first electronic device 100.

In step S414, the first electronic device 100 retains a part of first image data corresponding to the time stamp according to the time stamp of the first event message, for example, regains image data corresponding to five minutes before and after the time stamp of the first event message, so as to prevent deleting of the image data, though the disclosure is not limited thereto.

Then, in step S416, the first electronic device 100 transmits the first event message to the server platform 300. Moreover, the first electronic device 100 transmits the first event message to the adjacent second electronic device 200.

Referring to FIG. 4B, in step S420, the server platform 300 receives the event message and generates a tracking message according to the event message. Then, in step S422, the server platform 300 sends the tracking message to the second electronic device 200 located within a first predetermined range corresponding to the location stamp of the event message.

In step S424, if the server platform 300 does not receive the notification message transmitted back by the second electronic device 200, the server platform 300 executes a step S426, by which the server platform 300 sends the tracking message to the second electronic device 200 located within a second predetermined range corresponding to the event message.

In step S428, the server platform 300 again determines whether the notification message coming from the second electronic device 200 is received. If the server platform 300 still does not receive the notification message, the server platform 300 stops tracking the first predetermined range and the second predetermined range corresponding to the event message.

In the step S424 and the step S428, if the server platform 300 receives the notification message from the second electronic device 200, the server platform 300 executes a step S430, by which the server platform 300 sends the tracking message to the second electronic device 200 located within the first predetermined range corresponding to the location stamp of the notification message.

In step S432, when the server platform 300 receives an event ending message, for example, the user logs in the server platform 300 through the Internet and sets the event to end, the server platform 300 stops tracking the first electronic device 100. If the server platform 300 does not receive the event ending message, the server platform 300 continually sends the tracking message and receives the notification message until the end of the event or no more notification message is received.

Referring to FIG. 4C, regarding the second electronic device 200, in step S440, after the second electronic device 200 receives the message, the second electronic device 200 executes a step S442 to determine whether the device identifier and the event identifier in the message are the same. If the identifiers are the same, it represents that the message is the first event message sent by the first electronic device 100. Now, the second electronic device 200 executes a step S444 to generate a second event message according to the first event message.

In the message of the step S442, when the device identifier and the event identifier are different (i.e. the message is the tracking message), the second electronic device 200 executes a step S446 to continually detect whether a captured environment image includes a vehicle matched with the event feature value. If the vehicle matched with the event feature value is detected, the second electronic device 200 executes a step S448 to generate a notification message. After the step of generating the second event message and the step S448 of generating the notification message, the second electronic device 200 retains second image data corresponding to the time stamp according to the time stamp in the second event message/the notification message. Then, the second electronic device 200 transmits the second event message/the notification message to the server platform 300.

In summary, according the object tracking system and the object tracking method of the disclosure, when the object is detected, other electronic device can be used to provide a location stamp obtained when the object is detected to the server platform. The server platform may keep updating the location of the object according to the location stamp, and send a tracking message used for seeking the object to the electronic devices around the latest location of the object, so as to keep tracking the object. Moreover, when the other electronic devices detect the object, the other electronic devices may retain image data related to the object. In this way, when it is required to track the object, related person of the event may track the location of the object and retain files related to the event with assistance of the other electronic devices. Particularly, in an embodiment of disclosure, when a vehicle theft event is occurred, the police and the vehicle owner may still tack the stolen vehicle with assistance of the other electronic devices and retain important evidences in case that the GPS and the driving recorder of the vehicle are destroyed by the theft.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An object tracking system, comprising:
a plurality of electronic devices; and
a server platform, generating a tracking message based on an event message, and sending the tracking message to at least one of the electronic devices located within a first predetermined range corresponding to the event message,
wherein the at least one of the electronic devices generates a notification message and sends the notification message to the server platform in response to that the at least one of the electronic devices detects an object matched with an event feature value of the event message according to the tracking message,
wherein when the server platform does not receive the notification message, the server platform sends the tracking message to at least one of the electronic devices located within a second predetermined range corresponding to the event message, wherein the first predetermined range is smaller than the second predetermined range, and
when the server platform receives the notification message, the server platform sends the tracking message to the at least one of the electronic devices located within the first predetermined range corresponding to the notification message.

2. The object tracking system as claimed in claim 1, wherein the server platform sends the tracking message to the at least one of the electronic devices located within the first predetermined range corresponding to the notification message in response to that the server platform receives the notification message.

3. The object tracking system as claimed in claim 1, wherein the event message is a first event message received by the server platform from the object, and the first event message is generated by the object.

4. The object tracking system as claimed in claim 1, wherein the event message is a second event message received by the server platform from one of the electronic devices, wherein the second event message is generated according to a first event message received by the one of the electronic devices and a location stamp of the one of the electronic devices itself, wherein the first event message is generated by the object.

5. The object tracking system as claimed in claim 4, wherein the electronic devices further retain image data corresponding to the first event message in response to that the electronic devices receive the first event message.

6. The object tracking system as claimed in claim 1, wherein the event message is a third event message received by the server platform from a user device.

7. The object tracking system as claimed in claim 1, wherein the event message comprises at least one of a device identifier, an event identifier, a location stamp, a time stamp, an event type.

8. The object tracking system as claimed in claim 1, wherein the object is a vehicle, and the event feature value comprises at least one of a license plate number, a vehicle identifier, a vehicle color and a vehicle type.

9. An object tracking method, adapted to an object tracking system, wherein the object tracking system comprising a plurality of electronic devices and a server platform, the method comprising:
generating a tracking message according to an event message by the server platform;
sending the tracking message by the server platform to at least one of the electronic devices located within a first predetermined range corresponding to the event message;
detecting an object by the at least one of the electronic devices to determine the object is matched with an event feature value of the tracking message by the at least one of the electronic devices being located within the first predetermined range, and generating a notification message therefrom, and then transmitting the notification message to the server platform;

sending the tracking message to at least one of the electronic devices located within a second predetermined range corresponding to the event message when the server platform does not receive the notification message, wherein the first predetermined range is smaller than the second predetermined range; and sending the tracking message to the at least one of the electronic devices located within the first predetermined range corresponding to the notification message by the server platform when the server platform receives the notification message.

10. The object tracking method as claimed in claim 9, the server platform sends the tracking message to the at least one of the electronic devices located within the first predetermined range corresponding to the notification message in response to the notification message received.

11. The object tracking method as claimed in claim 9, wherein the step of generating the tracking message according to the event message comprises receiving a first event message from the object.

12. The object tracking method as claimed in claim 9, wherein the step of generating the tracking message according to the event message comprises:

generating a second event message according to a first event message and a location stamp of any of the electronic devices when the any of the electronic devices receives the first event message, and sending the second event message to the server platform, wherein the first event message is generated by the object.

13. The object tracking method as claimed in claim 12, wherein the electronic device retains image data corresponding to the first event message in response to the first event message received.

14. The object tracking method as claimed in claim 9, wherein the step of receiving the event message comprises receiving a third event message sent to the server platform by a user device.

15. The object tracking method as claimed in claim 9, wherein the event message comprises at least one of a device identifier, an event identifier, a location stamp, a time stamp, an event type.

16. The object tracking method as claimed in claim 9, wherein the object is a vehicle, and the event feature value comprises at least one of a license plate number, a vehicle identifier, a vehicle color and a vehicle type.

\* \* \* \* \*